United States Patent [19]

Koyama

[11] Patent Number: 5,594,711
[45] Date of Patent: Jan. 14, 1997

[54] OPTICAL RECORDING AND REPRODUCING APPARATUS USING A PLURALITY OF LIGHT SPOTS FOR RECORDING AND REPRODUCING

[75] Inventor: Osamu Koyama, Yokohama, Japan

[73] Assignee: Canon Kabushiki Kaisha, Tokyo, Japan

[21] Appl. No.: 348,136

[22] Filed: Nov. 23, 1994

[30] Foreign Application Priority Data

Nov. 26, 1993 [JP] Japan .................................. 5-296835

[51] Int. Cl.$^6$ .................................................. G11B 7/095
[52] U.S. Cl. ................................... 369/44.37; 369/44.28; 369/44.32
[58] Field of Search .............................. 369/44.37, 44.38, 369/44.12, 44.14, 112, 109, 110, 119, 44.32, 121, 44.28, 13, 44.13

[56] References Cited

U.S. PATENT DOCUMENTS

| | | | |
|---|---|---|---|
| 4,853,917 | 8/1989 | Koyama et al. | 369/44 |
| 5,073,884 | 12/1991 | Kobayashi | 369/44.37 |
| 5,130,965 | 7/1992 | Karaki et al. | 369/44.38 |
| 5,138,592 | 8/1992 | Fujita | 369/44.37 X |
| 5,386,404 | 1/1995 | Koyama | 369/44.23 |

FOREIGN PATENT DOCUMENTS

| | | |
|---|---|---|
| 51-107121 | 9/1976 | Japan . |
| 54-146613 | 11/1979 | Japan . |
| 62-75948 | 4/1987 | Japan . |
| 63-268103 | 11/1988 | Japan . |
| 64-19535 | 1/1989 | Japan . |
| 64-82348 | 3/1989 | Japan . |
| 1177510 | 7/1989 | Japan . |

*Primary Examiner*—Thang V. Tran
*Attorney, Agent, or Firm*—Fitzpatrick, Cella, Harper & Scinto

[57] ABSTRACT

An optical apparatus includes a focuser for focusing and imaging a beam passing through an imaging optical system as a plurality of light spots, for recording and reproducing information on the same or adjacent tracks on a rotating optical recording medium having substantially concentric tracks; an adjuster for adjusting positions of first and second light spots with respect to a predetermined track; a tracker for positioning the first light spot with respect to an arbitrary track, using return light thereof from the medium, while keeping the relative positional relation of the light spots relative to the predetermined track; a moving device for moving the light spots in parallel with the radial direction of the medium, and a setter for setting $\Delta$, P, R1, R2, and d to satisfy:

$$\Delta \leq P \cdot R1 \cdot R2 / \{15 \cdot d \cdot (R2 - R1)\}$$

where $\Delta$ is the distance between the center of rotation of concentric tracks and the focus of the first light spot in the radial direction on the medium, d is the distance between the first and second light spots, R1 is an innermost radial position of the light spots from the center of rotation of the tracks, R2 is the outermost radial position of the light spots from the center of rotation of the tracks, and P is the track pitch.

24 Claims, 10 Drawing Sheets

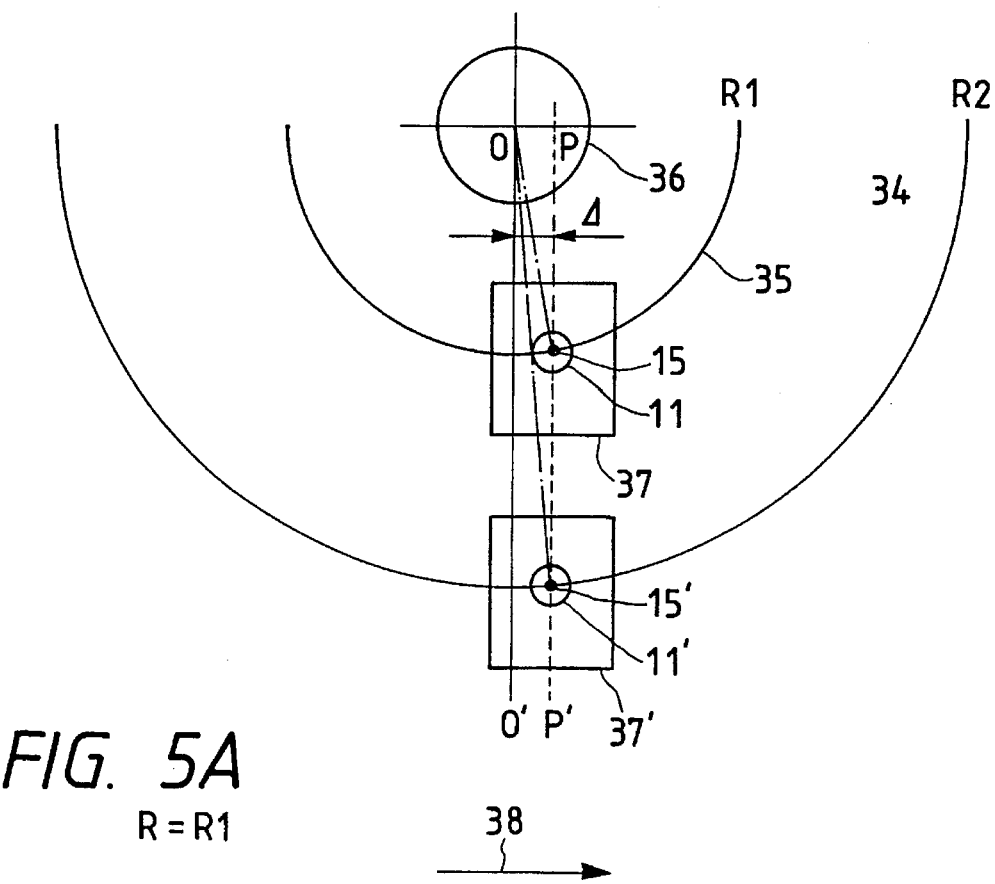
FIG. 4
FIG. 5A
R = R1
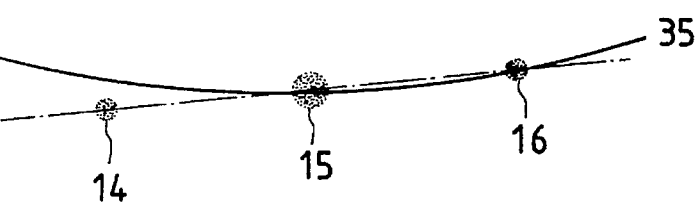
FIG. 5B
R = R2
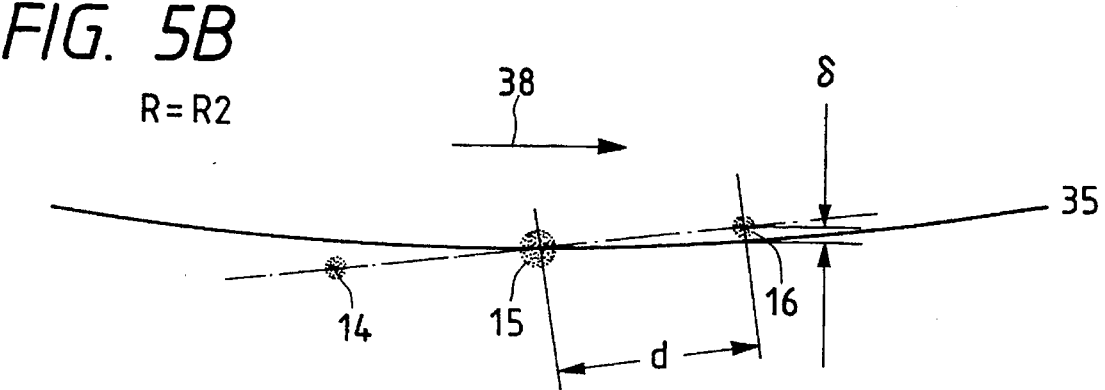

R = R3

R = R1

R = R2

R = R3

R = R1

R = R2

OPTICAL RECORDING AND REPRODUCING APPARATUS USING A PLURALITY OF LIGHT SPOTS FOR RECORDING AND REPRODUCING

BACKGROUND OF THE INVENTION

1. Field of the Invention

The present invention relates to optical disk apparatus, and more particularly to optical disk apparatus which employ a semiconductor laser source to produce a plurality of light spots on an optical disk, thereby enabling the performing of overwriting and verification immediately after recording almost at the same time.

Further, the present invention relates to optical disk apparatus, and more particularly to optical recording and/or reproducing apparatus which employ a semiconductor laser source to produce a plurality of light spots on an optical disk, thereby enabling the performing of recording and reproduction in parallel.

2. Related Background Art

Recently, research and development has been active in improving the transfer rate of a magneto-optical disk apparatus. The magneto-optical disk apparatus presently commercially available require three rotations of the disk for erasing, recording, and reproducing (verifying) in writing data, thus having a drawback that the data transfer rate, especially in recording, is lower than hard disks and the like. Then there are proposed magneto-optical disk apparatus and magneto-optical disks which are overwritable and which can perform erasing and recording during a rotation of a disk. Also proposed are magneto-optical disk apparatus which can perform verification immediately after recording with a plurality of light spots, or apparatus which can perform recording and reproducing in parallel with a plurality of light spots.

As an example of the overwritable magneto-optical disk apparatus, as disclosed in Japanese Laid-open Patent Application No. 51-107121, there is a method for modulating a magnetic field applied to a magneto-optical recording medium in accordance with recording information. In order to improve the data transfer rate of magneto-optical disk apparatus, another proposal was given, for example in Japanese Laid-Open Patent Application No. 64-82348, which discloses an optical disk apparatus in which, in addition to the above, a plurality of light spots are provided for recording and for verifying on a track to enable the performing of erasing, recording, and reproducing (verifying) during a rotation of a disk. Since these are arranged to modulate the magnetic field applied to the magneto-optical recording medium in accordance with recording information, they are called a magnetic field modulation overwriting method.

Also, there are magneto-optical recording media which are overwritable by modulating a light beam for writing data into a magneto-optical recording medium, for example, as suggested in Japanese Laid-open Patent Applications No. 62-75948, No. 63-268103, etc. These recording media are overwritable because of their structure in which multilayer magnetic films having different characteristics of their Curie temperature or coercive force are exchange-coupled. These are called a light intensity modulation overwriting method.

Further, there are apparatus which employ a plurality of light sources to provide a plurality of light spots on adjacent tracks on a recording medium, thereby performing recording and reproducing in parallel, for example, as suggested in Japanese Laid-open Patent Applications No. 54-146613, No. 64-19535, etc. Using a semiconductor laser array as a light source, these achieve parallel recording and reproducing even using substantially the same optical system as in the conventional magneto-optical disk apparatus employing a single light source.

Since magneto-optical disk apparatus utilize the property that the optical system can propagate a plurality of light beams in a multiplexed manner as described, it is to be expected that the data transfer rate can be improved to be comparable with that of a hard disk apparatus or greater than that.

Incidentally, where the data transfer rate of magneto-optical disk apparatus is improved by such an arrangement that a plurality of laser light sources are used to perform overwriting and verification immediately after recording with a rotation of a disk or by such an arrangement that recording and reproduction are processed in parallel over a plurality of tracks, it is necessary that the plurality of light spots be arranged to accurately track a predetermined track or predetermined tracks thereon.

There are optical disk apparatus utilizing an operation of an image-rotating prism in order to keep a plurality of light spots accurately tracking on a track, as suggested in Japanese Laid-open Patent Application No. 1-177510, etc.

A conventional example is described by referring to FIG. 1. Reference numeral 1 designates a magneto-optical recording medium exhibiting a magneto-optical effect, provided on a disk. Also provided is a transparent substrate 3, and a protection film 2 thereof. A beam emitted from a semiconductor laser 4 is collimated by a collimator lens 5 and the collimated beam is separated by a diffraction grating 6 into a plurality of beams (three beams of the zeroth order and ±first order). The beams incident into a dove prism 7 are then reflected by an internal surface thereof and then enter a polarization beam splitter 9. Numeral 8 denotes an actuator for rotating the dove prism 7 about the optical axis. The beam reflected by a mirror 10 are focused by an objective lens 11 to form three light spots 14, 15, 16 on a predetermined track on the magneto-optical recording medium 1. Numeral 12 denotes an actuator for focusing and tracking, which drives the objective lens 11.

FIG. 2 shows the light spots on the magneto-optical recording medium 1 and the intensities of the respective light spots upon recording and upon reproduction. The central light spot 15 is zeroth order light while the peripheral light spots 14 and 16 are the ±first order defracted light, as aligned as shown on a track on the recording medium 1.

Taking the direction of rotation of the disk to be along the direction of the arrow, the light spot 15 is a recording/erasing light spot, and the light spot 16 is a light spot for verification immediately after recording. A ratio between the intensities of the respective light spots can be changed by the diffraction grating 6. For example, a ratio can be 1 mW for verification relative to 7 mw for recording and erasing.

FIG. 2 also includes emission power of the laser light source in respective processes of reproduction and recording. The laser is arranged to emit light at a low power Pr upon reproduction, so that the light spot 15 on this occasion is 1 mw to be used for reproduction of magneto-optical signals or for the detection of servo signals. The optical spot 16 is not used because of the low power thereof. Upon recording the laser is arranged to emit light at high power Pw. On this occasion the light spot 15 functions as a recording/erasing light spot. With irradiation of the laser light of high power, the temperature of recording medium 1 increases so as to lower the magnetization and the coercive force thereof. Thus, applying a magnetic field polarity-inverted in accordance with recording information by means of a magnetic head 13, magneto-optical pits are recorded. On the other hand, the light spot 16 has the reproduction power, and performs an error check immediately after recording while reproducing the magnetic-optical signals.

In FIG. 1, after being reflected by the magneto-optical recording medium 1 and again entering the objective lens 11, the beams travel to the mirror 10 and are then reflected by the polarization beam splitter 9 to be guided to a signal detection system.

FIG. 1 shows a differential detection system using a half wave plate 21 and a polarization beam splitter 22. Beams passing through the polarization beam splitter 22 are guided through a condenser lens 23 and a cylindrical lens 24 onto a photodetector 25. Beams reflected by the polarization beam splitter 22 are guided through a condenser lens 25 onto a photodetector 27. Reproduction of the magneto-optical signals is achieved using differential outputs (not shown) from the photodetectors 25 and 27. In FIG. 1, numeral 17 denotes a drive circuit for the semiconductor laser 4, 18 denotes a drive circuit for the actuator 8, 19 denotes a drive circuit for the actuator 12, 20 denotes a drive circuit for the magnetic head 13, 28 denotes a circuit for detecting magneto-optical signals and servo signals, and 29 denotes a controller.

Next described, referring to FIG. 3, is a detection system for detecting the servo signals, especially, tracing signals. FIG. 3 shows a state where the condenser lens 26 condenses the beams reflected by the polarization beam splitter 22 to form light spots 30-1, 30-2, and 30-3 on corresponding photodetectors 27-1, 27-2, and 27-3. The light spot 30-2 corresponds to the recording/erasing light spot 15 on the recording medium, and the light spot 30-3 corresponds to the verifying light spot 16.

Upon overwriting, two light spots need to be laid on a track on the recording medium. Then tracking is carried out in the ordinary push-pull method with the recording/erasing light spot 15. Outputs from the light spot 30-2 on the bisectional photodetector 27-2 are put through a differential amplifier 31 into the actuator drive circuit 19 to carry out tracking by the actuator 12 for the objective lens 11.

Next, in order to correct rotation in the plane of the recording medium, of the recording/erasing light spot 15 and the verifying light spot 16, differential outputs between the push-pull outputs of the light spots 30-1 and 30-3 are used. Since the differential outputs are low frequency outputs indicating an amount of rotation of the light spots 14 and 16 relative to a track, they are put into the actuator drive circuit 18 to perform rotation servo of light spots by the actuator 8 for rotating the dove prism. According to these procedures, the recording/erasing light spot 15 and verifying light spot 16 can be laid correctly on the same track within predetermined accuracy upon overwriting. For normal reproduction, the tracking of the push-pull method is simply carried out using only the light spot 15.

The above conventional example, however, requires the dove prism 7 and image-rotating acutator 8 in order to maintain the predetermined tracking accuracy for two light spots and, in addition, the three light spots on the photodetectors require precise positioning in the tracking direction, thus causing an increase in costs. Also, the structure of the optical head is complicated, thus making compact designing difficult.

In view of the problems in the above conventional example, an object of the present invention is to provide an optical head which needs neither a dove prism nor an image-rotating actuator, which is cheap and compact, and which achieves the predetermined tracking accuracy for a plurality of light spots, and also to provide an optical recording and/or reproducing apparatus using it.

Causes of track deviation of the verifying light spot 16 were investigated while effecting the tracking servo operation of the ordinary push-pull method only with the recording/erasing light spot 15. It was found by the investigation that a dominating factor was the positional deviation in the track direction between the center of rotation of the disk and the optical spot.

This will be described by using FIG. 4 and FIGS. 5A and 5B. In FIG. 4, reference numeral 34 designates a magneto-optical disk and 35 denotes a track on the disk. The magneto-optical disk 34 is loaded on a spindle motor 36 to rotate about the center O. Numeral 37 denotes a movable unit of an optical head, and numerals 11 and 15 denote an objective lens and a recording/erasing light spot, respectively. There are the objective lens 11, the actuator 12 for driving it, and the mirror 10 set in the optical head movable unit 37. In order to reduce the access time to a target track, the movable unit is composed of minimum components, and the heavy semiconductor laser source and signal detection system are set in a stationary unit 40 of the optical head.

Such a construction of the optical head is called a separate optical system, in which the optical head movable unit 37 moves in parallel with the radial direction O–O' of magneto-optical disk 34, for example on P–P', so as not to cause an optical axis deviation when it moves from the inner periphery (radius R1) to the outer periphery (radius R2) of disk 34. Numerals 11', 15', 37' represent the objective lens, the recording/erasing light spot, and the optical head movable unit, respectively, having moved to the outer peripheral portion of magneto-optical disk 34.

With a single light spot, the positional deviation in the track direction between the center of rotation of the disk and the light spot, i.e., the distance $\Delta$ between O–O' and P–P', rarely matters. This distance $\Delta$ does, however, matter for the optical head which is arranged to lay a plurality of light spots on the track for verification or the like immediately after recording.

This is next described referring to FIGS. 5A and 5B. They are enlarged drawings near the track 35 in FIG. 4 where the three light spots are focused. The zeroth order light and ±first order diffracted light separated by the diffraction grating 6 is focused as the light spots 15 and 14, 16, respectively, on a track of disk 34. The light spot 15 is used for recording or erasing and the light spot 16 for verification. The arrow 38 represents the direction of rotation of the disk.

For example, suppose the light spots 15 and 16 are set on a same track at the inner peripheral position of the disk (radius R1), as shown in FIG. 5A. A line connecting the two light spots is perpendicular to a line connecting the rotation center O of magneto-optical disk 34 with the light spot 15 in FIG. 4. If the optical head movable unit 37 is moved in this state to the outer peripheral position (radius R2), it is seen, as shown in FIG. 5B, that a difference in curvature between an inner peripheral track and an outer peripheral track causes the light spot 16 to have a detrack $\delta$ when the light spot 15 is set on the track. The detrack $\delta$ can be expressed by the formula below with a distance d between the two light spots. In the formula, R1 is an innermost radial position of movement of the plural light spots from the rotation center of concentric tracks and R2 an outermost radial position of movement of the plural light spots from the rotation center of concentric tracks.

$$\delta = d \cdot \Delta \cdot (R2-R1)/R1 \cdot R2) \quad (1)$$

Applying this to a 3.5-inch optical disk and letting R1=24 mm, R2=40 mm, for example, d=0.02 mm, and Δ=1 mm, then δ=0.33 μm, which is an unignorable amount as compared with the track pitch=1.6 μm. The conventional example compensated for the detrack using a complicated mechanism including the dove prism and image-rotating actuator, which increased the costs because of the need for precise positioning of three light spots on the photodetectors in the tracking direction, as described previously. Also, the structure of the optical head was complicated, thus making compact designing difficult.

Therefore, the present invention has achieved the above object by the following arrangements of the optical recording/reproducing apparatus.

SUMMARY OF THE INVENTION

An optical recording and/or reproducing apparatus of the present invention comprises:

focusing means for focusing a beam from a light source passing through an imaging optical system to image the beam as a plurality of fine light spots, for performing at least one of recording of information and reproduction of information, on the same track on an optical recording medium rotating and having substantially concentric tracks;

adjusting means for adjusting the positions of a first light spot and a second light spot except therefor out of the plurality of light spots with respect to a predetermined track in a direction transverse to the track;

tracking means for performing positioning in a direction transverse to the track of the optical recording medium, of the first light spot with respect to an arbitrary track, using return light from the optical recording medium, of the first light spot, while keeping a relative positional relation of the plurality of light spots relative to the predetermined track; and moving means for moving the plurality of light spots in parallel to a radial direction of the optical recording medium;

wherein the following relation holds:

$$\Delta \leq P \cdot R1 \cdot R2 / \{15 \cdot d \cdot (R2-R1)\}$$

where Δ is the distance between a center of rotation of the concentric tracks and a locus of the first light spot moving in the radial direction on the recording medium, d is the distance between the first light spot and the second light spot except therefor on the optical recording medium, R1 is an innermost radial position of the plurality of light spots moved by the moving means, from the center of rotation of the concentric tracks, R2 is an outermost radial position of the plurality of light spots moved by the moving means, from the center of rotation of the concentric tracks, and P is a track pitch of the optical recording medium.

Another optical recording and/or reproducing apparatus of the present invention comprises:

focusing means for focusing a beam from a light source passing through an imaging optical system to image the beam as a plurality of fine light spots, for performing at least one of recording of information and reproduction of information, on adjacent tracks on an optical recording medium rotating and having substantially concentric tracks;

adjusting means for adjusting the positions of a first light spot and a second light spot except therefor out of the plurality of light spots with respect to a predetermined track in a direction transverse to the track;

tracking means for performing positioning in a direction transverse to the track of the optical recording medium, of the first light spot with respect to an arbitrary track, using return light from the optical recording medium, of the first light spot, while keeping a relative positional relation of the plurality of light spots relative to the predetermined track; and moving means for moving the plurality of light spots in parallel with a radial direction of the optical recording medium;

wherein the following relation holds:

$$\Delta \leq P \cdot R1 \cdot R2 / \{15 \cdot d \cdot (R2-R1)\}$$

where Δ is the distance between a center of rotation of the concentric tracks and a locus of the first light spot moving in the radial direction on the recording medium, d is a distance between the first light spot and the second light spot except therefor on the optical recording medium, R1 is an innermost radial position of the plurality of light spots moved by the moving means, from the center of rotation of the concentric tracks, R2 is an outermost radial position of the plurality of light spots moved by the moving means, from the center of rotation of the concentric tracks, and P is a track pitch of the optical recording medium.

BRIEF DESCRIPTION OF THE DRAWINGS

FIG. 4 is a drawing to illustrate a problem to be solved by the present invention, particularly, to illustrate the structure of the magneto-optical disk recording and/or reproducing apparatus;

FIGS. 5A and 5B are drawings to illustrate the problem to be solved by the present invention, particularly, to illustrate positioning of the light spots;

DETAILED DESCRIPTION OF THE PREFERRED EMBODIMENTS

In the present invention, positioning in a direction transverse to the track, of the two light spots 15, 16 is carried out without using the dove prism and the image-rotating actuator and thereafter the tracking servo of the ordinary push-pull method is effected only with the recording/erasing light spot 15.

Figure 1:
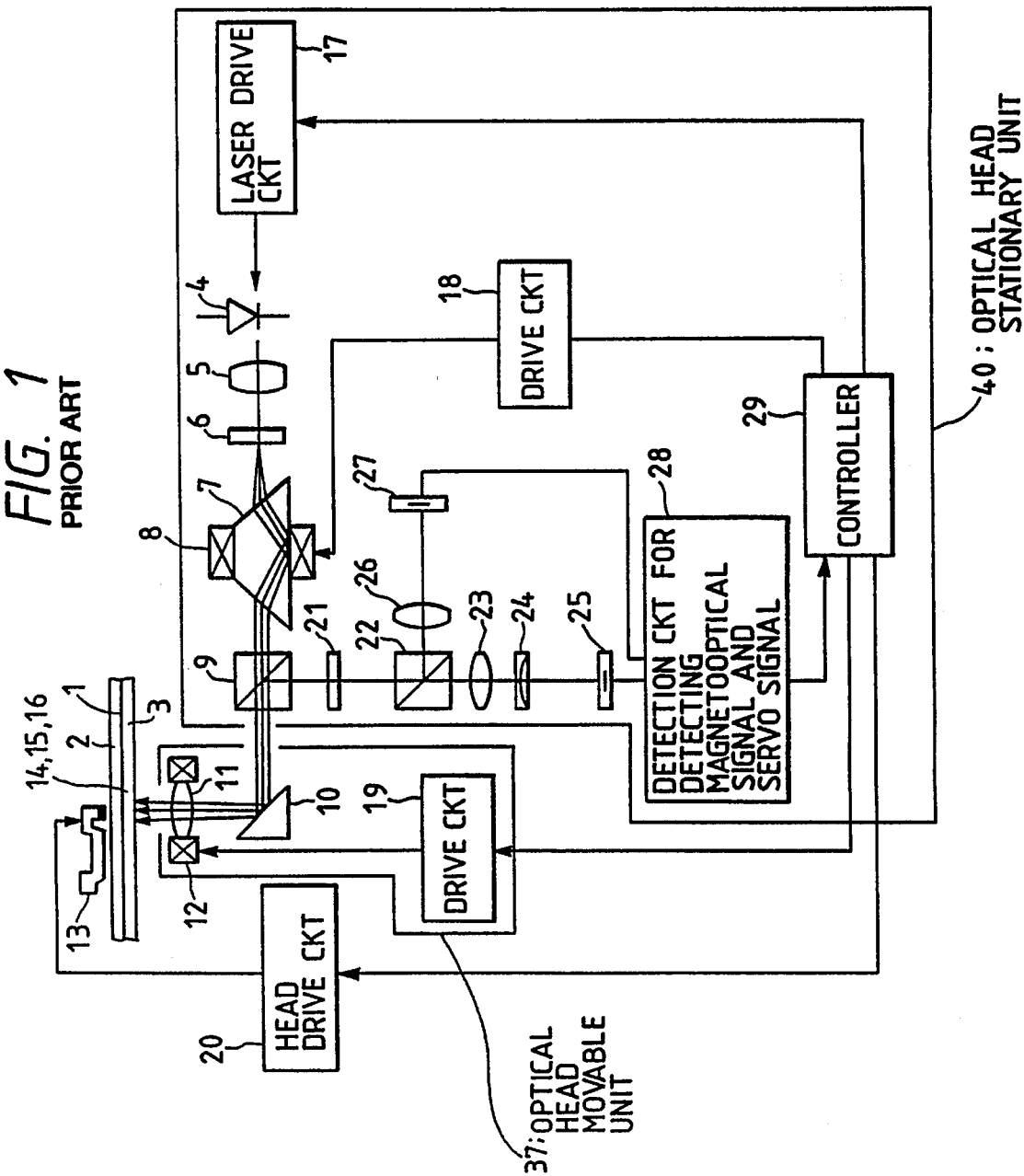
FIG. 1 is a drawing to illustrate the structure of a magneto-optical disk recording and/or reproducing apparatus as a conventional example.
Figure 2:
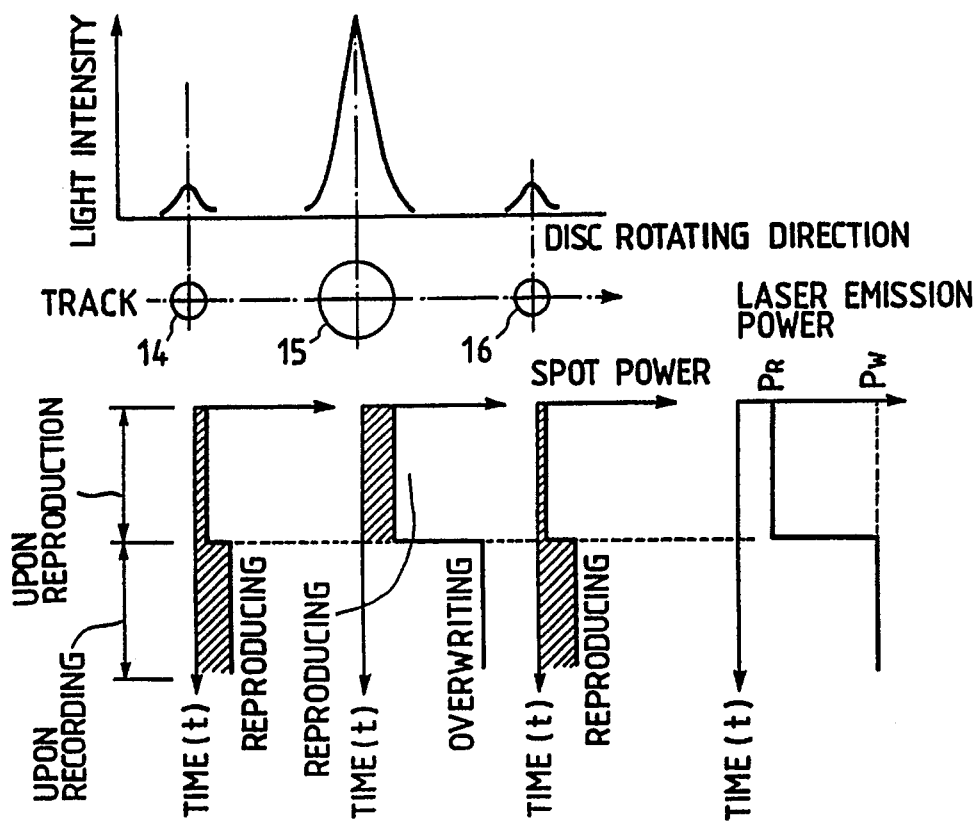
FIG. 2 is a drawing to illustrate the uses of a plurality of light spots in the magneto-optical disk recording and/or reproducing apparatus as the conventional example.
Figure 3:
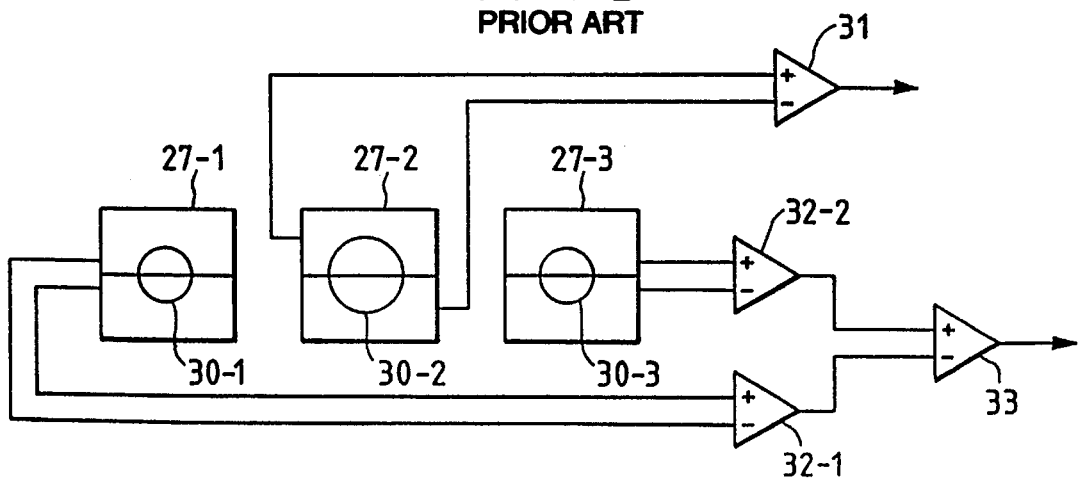
FIG. 3 is a drawing to illustrate a detection system for tracking signals.
Figure 6:
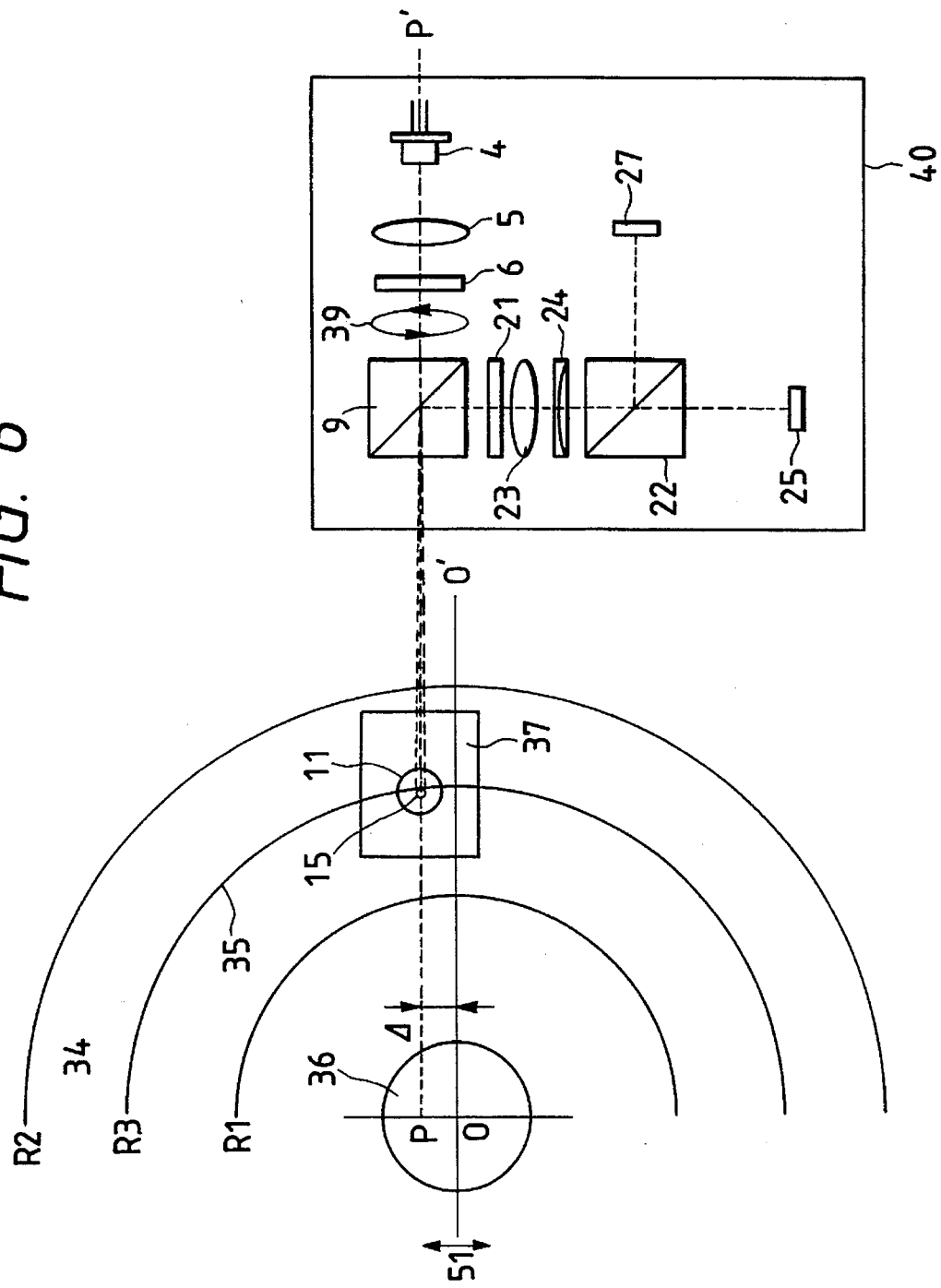
FIG. 6 is a drawing to illustrate the structure of a magneto-optical disk recording and/or reproducing apparatus, as observed from the front thereof, as a first embodiment of the present invention.
Figure 7:
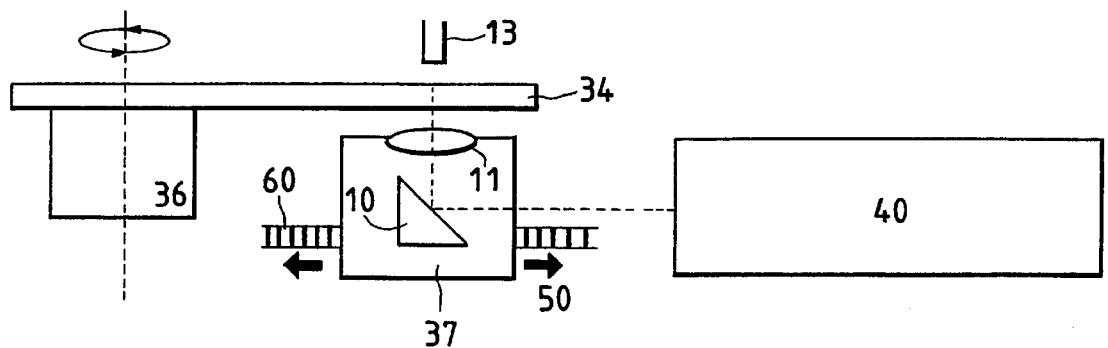
FIG. 7 is a drawing to illustrate the structure of the magneto-optical disk recording and/or reproducing apparatus, as observed from the side thereof, as the first embodiment of the present invention.

FIG. 6 and FIG. 7 show the first embodiment of the magneto-optical disk recording and/or reproducing apparatus of the present invention. FIG. 6 is a front view of the magneto-optical disk recording and/or reproducing apparatus of the present invention and FIG. 7 is a side view thereof. Components having the same functions as those in the conventional example shown in FIG. 1 are denoted by the same reference numerals and an explanation thereof is omitted.

A beam emitted from the semiconductor laser 4 is collimated by the collimator lens 5 and separated by the diffraction grating 6 into a plurality of beams (three beams of the zeroth order and ±first order). The diffraction grating 6 is arranged to be adjustable to rotate about the optical axis of the collimator lens 5, as shown by arrows 39, so that it can perform adjustment of positioning in a direction transverse to the track so as to set the two lights spots 15, 16 on the same predetermined track 35 on the magneto-optical disk 34.

The beams incident into the polarization beam splitter 9 are projected from the optical head stationary unit 40 toward the optical head movable unit 37. The beams reflected by the mirror 10 are focused by the objective lens 11 to form three light spots 14, 15, 16 on the same track 35 on the magneto-optical disk 34.

The optical head movable unit 37 is arranged to be moved by a linear motor 60 in the directions of arrows 50 in FIG. 7 and a locus thereof is on line P–P' parallel to the radial direction O–O' of the disk. The magneto-optical disk 34 is loaded on the spindle motor 36, and O is the center of rotation thereof. The radial direction of the disk is represented by O–O' and the distance between O–O' and P–P' is Δ. The light spot 15 is moved by the linear motor 60 in the P–P' direction on the magneto-optical disk 34.

In the magneto-optical disk recording and/or reproducing apparatus of the present invention, the spindle motor 36 is arranged as movable in the directions 51 perpendicular to O–O' so as to adjust the distance Δ between O–O' and P–P'. The following formula was found from the experimental results of an investigation of relative detrack amount δ with a change of distance Δ, where the rotation adjustment of diffraction grating 6 was conducted while by moving the optical head movable unit 37 to an arbitrary radial position R3 (R1≦R3≦R2) on the magneto-optical disk 34 by the linear motor 60.

$$\Delta \leq P \cdot R1 \cdot R2 / \{15 \cdot d \cdot (R2-R1)\} \quad (2)$$

In the above formula (2), P is a track pitch of the magneto-optical disk 34, d a distance between the two adjacent light spots 15, 16, R1 an innermost radial position of the disk, and R2 an outermost radial position of the disk. For example, letting R1=24 mm, R2=40 mm, d=0.02 mm, and the track disk=1.6 μm, an acceptable distance Δ is 0.32 mm. In this case, the detrack amount δ=0.1 μm, whereby sufficient tracking accuracy can be secured.

More preferably, an acceptable amount of Δ can be expressed by the following formula.

$$\Delta \leq P \cdot R1 \cdot R2 / \{50 \cdot d \cdot (R2-R1)\} \quad (3)$$

Here, using the same parameters as in the above formula (2), an acceptable distance Δ is 0.1 mm. In this case, the detrack amount δ=0.03 μm, whereby sufficient tracking accuracy can be secured even taking the existence of other tracking error factors into account.

In FIG. 6, after being reflected by the surface of the recording medium of the magneto-optical disk 34 and again entering the objective lens 11, the beams are guided via the mirror 10, to be reflected by the polarization beam splitter 9 and then to be guided into the signal detection system.

FIG. 6 shows a differential detection system using the half wave plate 21 and polarization beam splitter 22. The beams having passed through the condenser lens 23 and cylindrical lens 24 are transmitted or reflected by the polarization beam splitter 22 to be guided onto the photodetector 25 or 27. The reproduction of magneto-optical signals is carried out by the same method as in previous FIG. 1.

Figure 8:
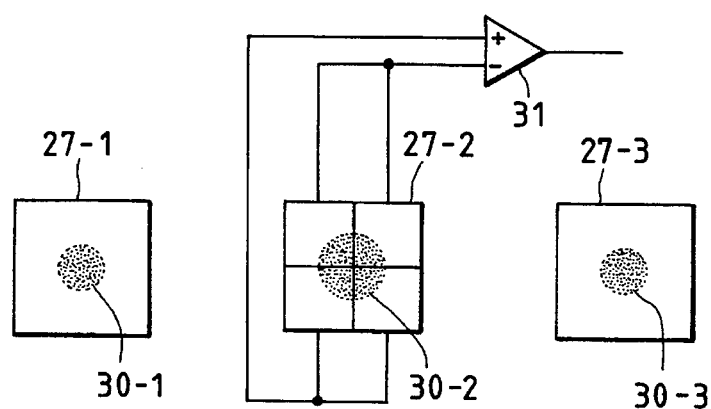
FIG. 8 is a drawing to illustrate a method for detecting tracking signals in an optical head in the first embodiment of the present invention.

Next described with FIG. 8 is the detection system of servo signals, particularly, of tracking signals. FIG. 8 shows a state where the condenser lens 23 condenses the beams reflected by the polarization beam splitter 9 to form the light spots 30-1, 30-2, and 30-3 on the respective photodetectors 27-1, 27-2, and 27-3. The light spot 30-2 corresponds to the recording/erasing light spot 15 on the recording medium, and the light spot 30-3 corresponds to the verifying light spot 16 for reproducing information immediately after recorded.

Upon overwriting the two light spots 15, 16 need to be laid accurately on the same track. Since the embodiment of the present invention is so arranged that the positional deviation Δ in the track direction (or in the direction perpendicular to the radial direction of the disk) between the rotational center of the disk and the light spots is adjusted at a value given by the above formula (2) or formula (3), a necessary operation is only tracking of the ordinary push-pull method (positioning in the direction transverse to the track) with the recording/erasing light spot 15 relative to an arbitrary track. Outputs of the light spot 30-2 on the photodetector 27-2 are supplied through the differential amplifier 31 into the actuator drive circuit 19, whereby the actuator 12 for the objective lens 11 performs the tracking relative to an arbitrary track.

The photodetectors 27-1, 27-3 do not have to be sectional sensors and do not need positioning with respect to the light spots 30-1, 30-3. Application of the present invention obviates the rotation servo of light spots using the dove prism and the rotation actuator thereof.

A quadrant sensor is used as the photodetector 27-2. Focus error signals can also be obtained from differential outputs between diagonal sums of respective sensor segments (not shown).

Further described is a preferred aspect of the embodiment of the present invention. In the first embodiment, the rotation adjustment of diffraction grating 6 was carried out while moving the optical head movable unit 37 to an arbitrary radial position R3 (R1≦R3≦R2) on the magneto-optical disk 34 by means of the linear motor 60. The rotation adjustment performed in the predetermined range of a radius as defined below is further more effective. Namely, it is preferred that the detrack δ, which is caused by the positional deviation Δ in the track direction between the rotational center of the disk and the light spots, at the innermost position (radius R1) be equal in amount but opposite in direction to that at the outermost position (radius R2). The condition for it is that the following formula holds.

$$\Delta \cdot (1/R3 - 1/R2) = \Delta \cdot (1/R1 - 1/R3)$$

From this, $$R3 = 2 \cdot R1 \cdot R2 / (R1 + R2) \quad (4)$$

For example, letting R1=24 mm and R2=40 mm, the optimum R3 is 30 mm. From the results of experiments in which the relative detrack amount δ was investigated with a change of Δ, it was found that the range given by the following formula was practically sufficient for the above formula (4).

$$1.8 \cdot R1 \cdot R2/(R1+R2) \leq R3 \leq 2.4 \cdot R1 \cdot R2/(R1+R2) \quad (5)$$

Figure 9A:
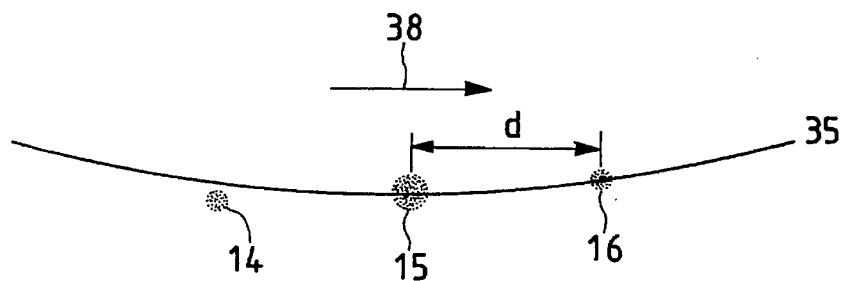
FIGS. 9A to 9C are drawings to illustrate the positioning of the light spots in the magneto-optical disk recording and/or reproducing apparatus as the first embodiment of the present invention.
Figure 9B:
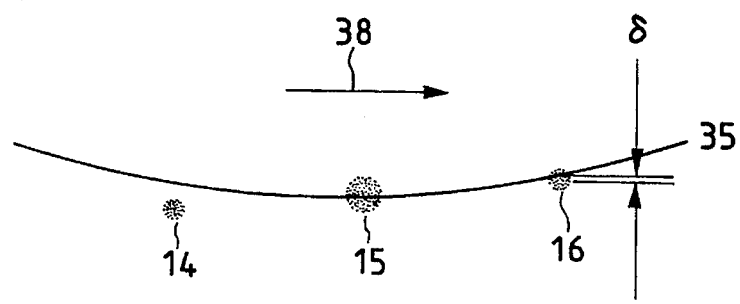
Figure 9C:
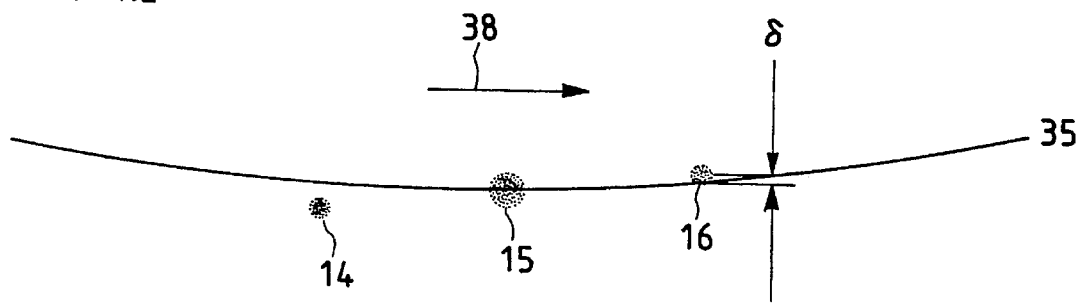

This is described using FIGS. 9A to 9C. FIG. 9A shows a case where the optical head movable unit 37 is moved to the radial position defined by the above formula (4) by means of the linear motor 60 and the rotation adjustment of diffraction grating 6 is carried out there to set the two light spots 15, 16 on a predetermined same track 35 on the magneto-optical disk 34. The arrow 38 represents the direction of rotation of the magneto-optical disk 34.

FIG. 9B or FIG. 9C shows a positional relation between the two light spots 15, 16 when the optical head movable unit 37 is moved to the innermost position (radius R1) or to the outermost position (radius R2), respectively, in this state by the linear motor 60.

It is seen that the following detrack occurs in the opposite directions at the innermost position and at the outermost position.

$$\delta = \pm d \cdot \Delta \cdot (R2 - R1)/(2 \cdot R1 \cdot R2)$$

As described, it is preferable that the positioning in a direction transverse to the track of the light spot 15 and light spot 16 be conducted in such a manner that the detrack of the light spot 16 as located at the innermost position (radius R1) is opposite in sign to that of the light spot 16 as located at the outermost position (radius R2).

The following formula was found from the results of experiments in which the relative detrack amount δ was investigated with a change of Δ under the conditions of the above formula (4) or formula (5).

$$\Delta \leq P \cdot R1 \cdot R2/\{8 \cdot d \cdot (R2 - R1)\} \quad (6)$$

For example, letting R1=24 mm, R2=40 mm, d=0.02 mm, and the track pitch of the disk=1.6 μm, the distance Δ may be 0.6 mm. In this case, the detrack amount δ=0.1 μm, whereby sufficient tracking accuracy can be secured.

More preferably, an allowable amount of Δ can be expressed by the following formula.

$$\Delta \leq P \cdot R1 \cdot R2/\{25 \cdot d \cdot (R2 - R1)\} \quad (7)$$

Here, using the same parameters as in the above formula (2), the distance Δ may be 0.2 mm. In this case, the detrack amount δ becomes 0.03 μm, whereby sufficient tracking accuracy can be secured even taking the existence of other tracking error factors into account.

Figure 10:
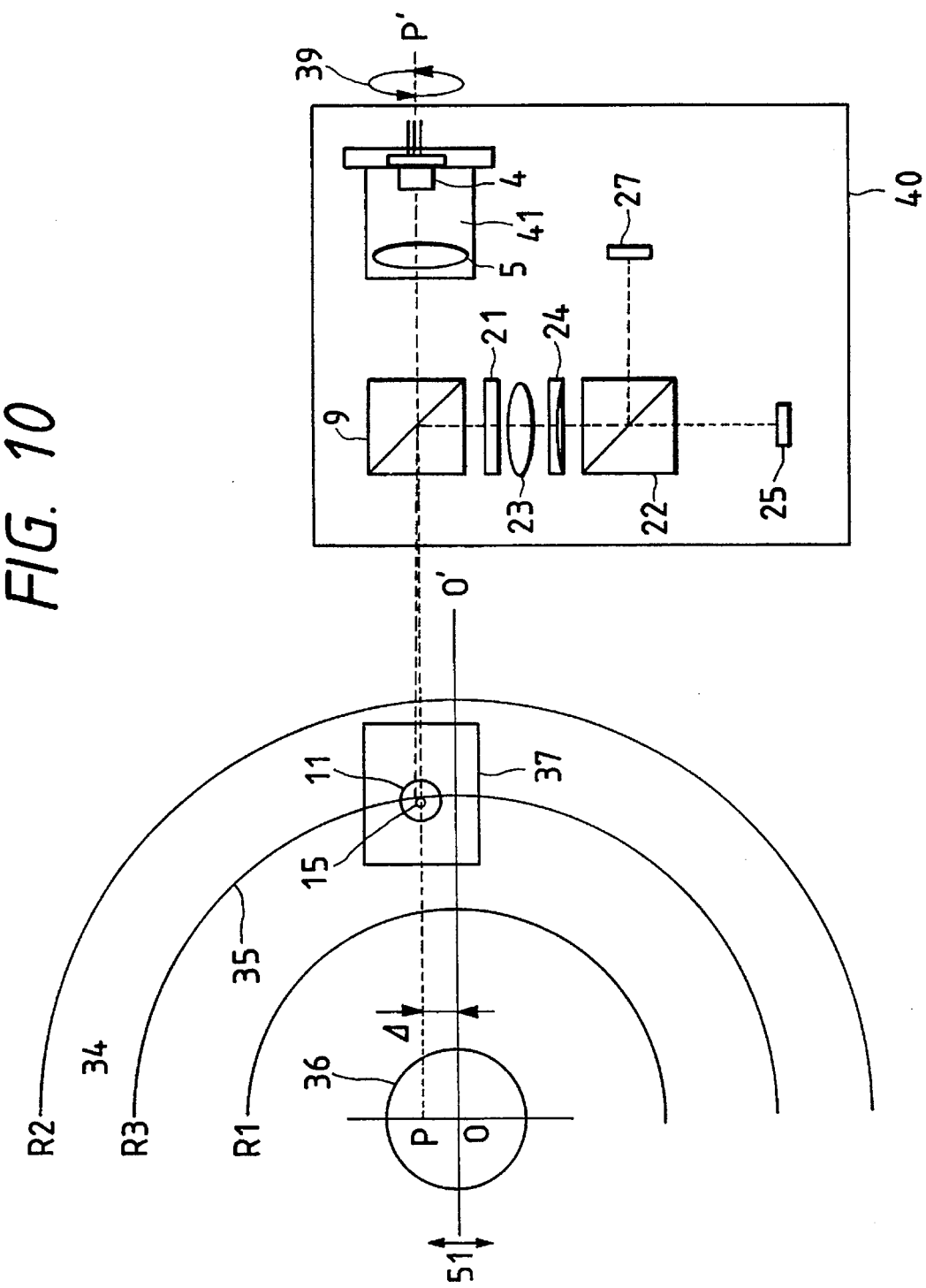
FIG. 10 is a drawing to illustrate the structure of another magneto-optical disk recording and/or reproducing apparatus, as observed from the front thereof, as a second embodiment of the present invention.
Figure 11:
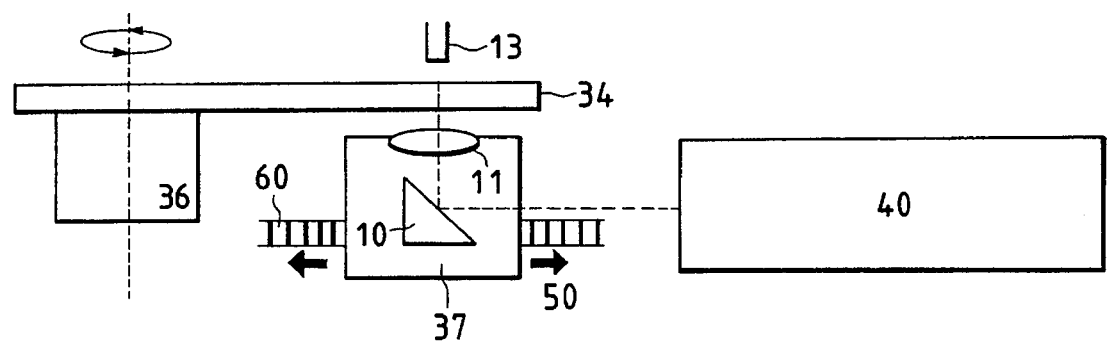
FIG. 11 is a drawing to illustrate the structure of the magneto-optical disk recording and/or reproducing apparatus, as observed from the side thereof, as the second embodiment of the present invention.

FIG. 10 and FIG. 11 show the second embodiment of the magneto-optical disk recording and/or reproducing apparatus of the present invention. FIG. 10 is a front view of the magneto-optical disk recording and/or reproducing apparatus of the present invention and FIG. 11 is a side view thereof components having the same functions as those in the conventional example of FIG. 1 are denoted by the same reference numerals and an explanation thereof is omitted.

The present embodiment is different from the first embodiment in that a semiconductor laser array 4' is employed as a light source for obtaining a plurality of beams. A plurality of radiative points in the semiconductor laser array 4' are aligned in the plane of FIG. 10.

A plurality of beams emitted from the semiconductor laser array 4' are collimated by the collimator lens 5. The semiconductor laser array 4' and collimator lens 5 are incorporated as a laser unit 41. The laser unit 41 is arranged as adjustable to rotate about the optical axis of the collimator lens 5, as shown by the arrows 39, so that a plurality of light spots can be set as positioned on a same track 35 on the magneto-optical disk 34.

Alternatively, the semiconductor laser array 4' may be arranged as adjustable to rotate about the optical axis of collimator lens 5, as shown by the arrows 39, whereby a plurality of light spots may be set as positioned on a same track 35 on the magneto-optical disk 34. In this case, the semiconductor laser array 4' and the collimator lens 5 do not always have be incorporated as a unit.

The beams incident into the polarization beam splitter 9 are projected from the optical head unit 37. The beams reflected by the mirror 10 are focused by the objective lens 11 to form two light spots 15, 16 on a predetermined same track 15 on the magneto-optical disk 34. The optical head movable unit 37 can be moved by the linear motor 60 in the directions of arrows 50 in FIG. 11, and a locus thereof is on line P–P' parallel to the radial direction O–O' of the disk. The magneto-optical disk 34 is set on the spindle motor 36 and O is the center of rotation thereof. The radial direction of the magneto-optical disk 34 is represented by O–O', and Δ designates the distance between O–O' and P–P'. The linear motor 60 moves the light spot 15 in the P–P' direction on the magneto-optical disk 34.

In the magneto-optical disk recording and/or reproducing apparatus of the present invention, the spindle motor is arranged as movable in the directions 51 perpendicular to O–O', whereby the distance Δ between O–O' and P–P' can be adjusted. Where the rotation adjustment of the laser unit 41 is carried out while moving the optical head movable unit 37 to an arbitrary radial position R3 (R1≦R3≦R2) on the magneto-optical disk 34 by means of the linear motor 60, the above-described formula (2) is derived in a similar manner to the first embodiment. More preferably, the allowable amount of distance Δ is expressed by the above formula (3) similar to the first embodiment.

In FIG. 11, after being reflected by the surface of the recording medium of magneto-optical disk 34 and again entering the objective lens 11, the beams are guided via the mirror 10 to be reflected by the polarization beam splitter 9 and then to be guided into the signal detection system.

FIG. 10 shows the differential detection system using the half wave plate 21 and polarization beam splitter 22. The beams having passed through the condenser lens 23 and cylindrical lens 24 are transmitted or reflected by the polarization beam splitter 22 and are then guided onto the photodetectors 25, 27. Reproduction of magneto-optical signals is carried out by the same method as in FIG. 1.

Figure 12:
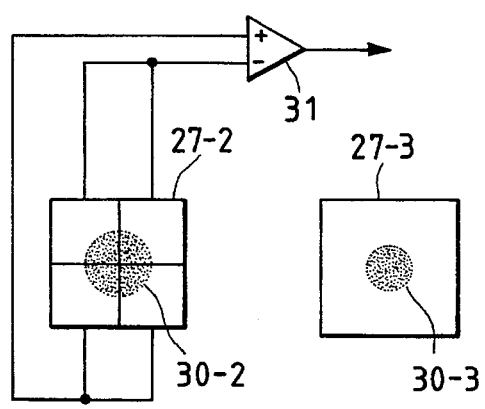
FIG. 12 is a drawing to illustrate a method for detecting the tracking signals in an optical head in the second embodiment of the present invention.

Next described using FIG. 12 is the detection system of servo signals, particularly, of tracking signals. FIG. 12 shows a state in which the condenser lens 23 condenses the beams reflected by the polarization beam splitter 9 to form light spots 30-2 and 30-3 on photodetectors 27-2 and 27-3, respectively. The light spot 30-2 corresponds to the recording/erasing light spot 15 on the recording medium, and the light spot 30-3 corresponds to the verifying light spot 16 for reproducing information immediately after recording.

Upon overwriting, it is necessary for the two light spots 15, 16 to be accurately laid on a track. Since the embodiment of the present invention is so arranged that the positional deviation Δ in the track direction between the rotational center of the magneto-optical disk and the light spots is adjusted to the value given by the above formula (2) or formula (3), it is enough to perform the tracking of the ordinary push-pull method with the recording/erasing light spot 15 relative to an arbitrary track.

Outputs of the light spot 30-2 on the photodetector 27-2 are supplied through the differential amplifier 31 into the actuator drive circuit 19, thereby performing tracking through the actuator 12 for the objective lens 11. The photodetector 27-3 does not have to be a sectional sensor and does not need positioning with the light spot 30-3. Application of the present invention obviates the rotation servo of the light spots employing the dove prism and rotation actuator thereof.

Here, a guadrant sensor is used as the photodetector 27-2, but it is noted that focus error signals can also be obtained from differential outputs between diagonal sums of respective sensor segments (not shown).

Further, a preferred aspect of the embodiment of the present invention is next described. In the second embodiment, the rotation adjustment of the laser unit 41 was carried out while moving the optical head movable unit 37 to an arbitrary radial position R3 (R1≦R3≦R2) on the magneto-optical disk 34 by the linear motor 60. The effect is further enhanced by performing the rotation adjustment at the predetermined radial position expressed by the above formula (4). Also, the above formula (4) is practically sufficient in the range given by the above formula (5), similar to the first embodiment.

Figure 13A:
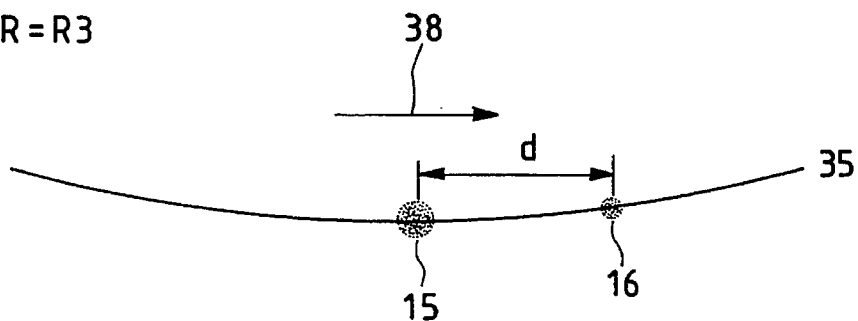
FIGS. 13A to 13C are drawings to illustrate positioning of the light spots in the magneto-optical disk recording and/or reproducing apparatus as the second embodiment of the present invention.
Figure 13B:
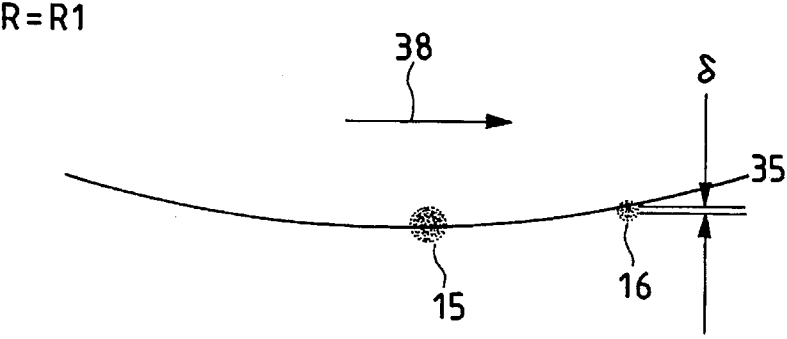
Figure 13C:
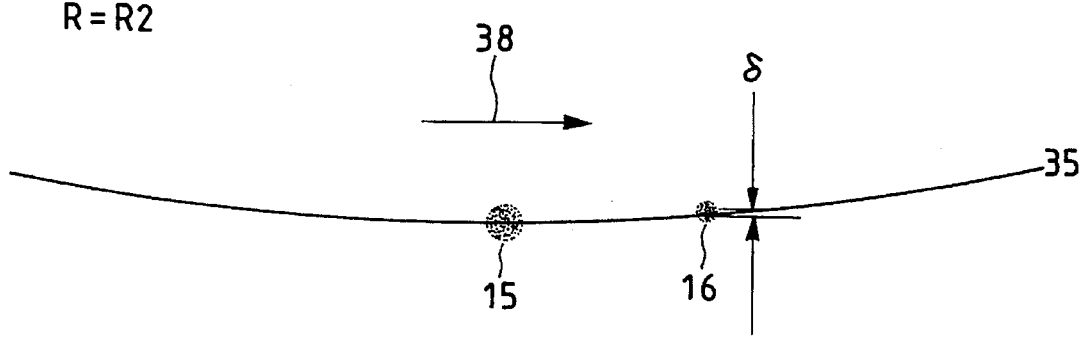

This is explained using FIGS. 13A to 13C. FIG. 13A shows a case where the optical head movable unit 37 is moved to the radial position of the above formula (4) by the linear motor 60 and the rotation adjustment of laser unit 41 is carried out there to set the two light spots 15, 16, on the same track 35 on the magneto-optical disk 34. The arrow 38 represents the direction of rotation of the magneto-optical disk 34.

FIG. 13B and FIG. 13C show the positional relations between the two light spots when the optical head movable unit 37 is moved in this state to the innermost position (radius R1) and to the outermost position (radius R2), respectively.

It is seen that the following detrack occurs in the opposite directions at the innermost position and at the outermost position.

$$\delta = \pm d \cdot \Delta \cdot (R2-R1)/(2 \cdot R1 \cdot R2)$$

The above formula (6) can be derived under the conditions of the above formula (4) or formula (5), similar to the first embodiment.

More preferably, the allowable amount of Δ can be expressed by the above formula (7).

Figure 14A:
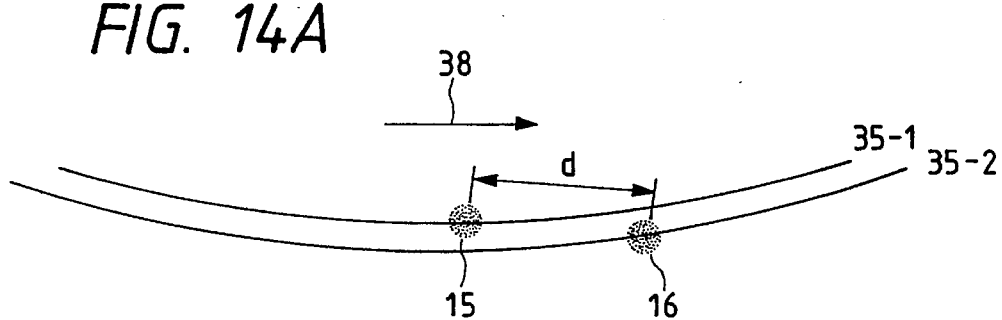
FIGS. 14A to 14C are drawings to illustrate positioning of the light spots in the magneto-optical disk recording and/or reproducing apparatus as a third embodiment of the present invention.
Figure 14B:
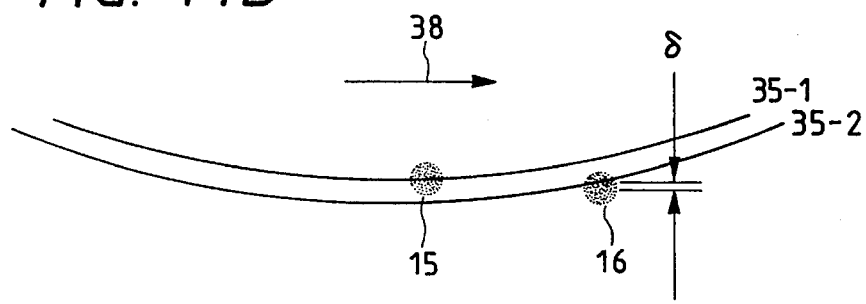
Figure 14C:
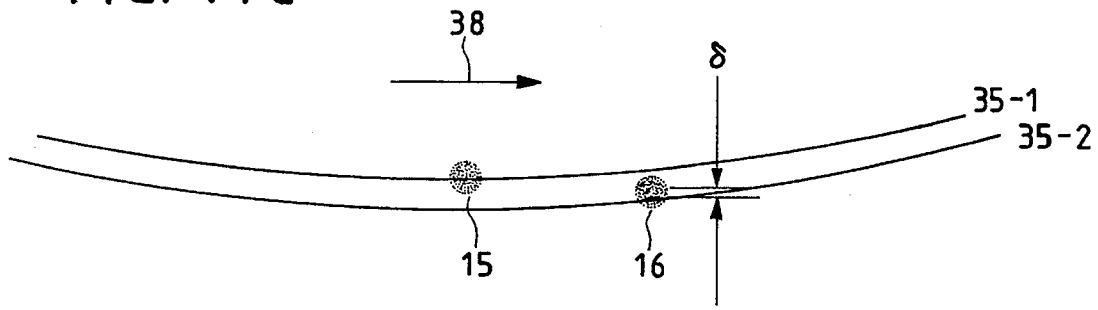

Further, the third embodiment is described using FIGS. 14A to 14C. In the first and second embodiments the plurality of light spots are set on a same track, but they may be set on adjacent tracks, for example, as shown in FIGS. 14A to 14C. Employing the arrangement using the semiconductor laser array as shown in FIG. 10 and FIG. 11 for the optical recording and/or reproducing apparatus, recording and reproduction can be made in parallel.

It is also preferred in the third embodiment that the rotation adjustment of laser unit 41 be performed at the predetermined radius expressed by the above formula (4). Also, the above formula (4) is practically sufficient within the range given by the above formula (5), similar to the second embodiment.

FIG. 14A shows a case where the optical head movable unit 37 is moved to the radial position of the above formula (4) and the rotation adjustment of laser unit 41 is carried out there to set the two light spots 15, 16, on adjacent tracks 35-1, 35-2, respectively, on the magneto-optical disk 34. The light spots 15 and 16 are used for simultaneous recording and reproduction of the track 35-1 and the track 35-2. The arrow 38 represents the direction of rotation of the magneto-optical disk 34.

FIG. 14B and FIG. 14C show the positional relations between the two light spots when the optical head movable unit 37 is moved in this state to the innermost position (radius R1) and to the outermost position (radius R2), respectively.

$$\delta = \pm d \cdot \Delta \cdot (R2-R1)/(2 \cdot R1 \cdot R2)$$

It is seen that the same detrack as in the second embodiment occurs in the opposite directions at the innermost position and at the outermost position.

The above formula (6) can be derived under the conditions of the above formula (4) or formula (5), similar to the second embodiment.

More preferably, the allowable amount of Δ can be expressed by the above formula (7).

The example of FIGS. 14A to 14C was so arranged that the two lights spots 15, 16 were set on the adjacent tracks 35-1, 35-2, but the same arguments hold as long as the direction of arrangement of the two light spots 15, 16 is substantially the same as the direction of the tracks. For example, the light spot 16 may be set on a next track to the track next to the light spot 15. Namely, when the distance between the light spots is d, the track pitch is P, and the two lights spots are set on a track and another n-th track next thereto, the present invention, can be applied as long as n·P is sufficiently smaller than d.

Although the above embodiments were described assuming the distance d between the light spots was a distance between two adjacent light spots, it should be noted that the distance d between the light spots represents a distance between two light spots positioned with respect to the same track or a distance between two light spots positioned with respect to adjacent tracks.

Although the above embodiment were described with two light spots being set on a same track or on adjacent tracks for simplicity, the present invention can also be applied to n (where n is 3 or more) light spots. In that case, the formulas (2) to (7) can be interpreted with d regarded as a distance between the light spot for obtaining tracking signals (corresponding to the light spot 15 in the first to third embodiments) and an arbitrary light spot other than it.

The above description of the present invention was provided as to the magneto-optical disk recording and/or reproducing apparatus, but the present invention can also be applied to other high-density optical memories.

As detailed above, the present invention is so arranged that the optical head movable unit 37 for forming the two light spots 15, 16 on the same track or on adjacent tracks on the magneto-optical disk 34 is movable in the P–P' direction parallel to the radial direction of the magneto-optical disk 34 and that the following relation is satisfied when the radial direction of the magneto-optical disk 34 is represented by O–O' and the distance between O–O' and P–P' is $\Delta$.

$$\Delta \leq P \cdot R1 \cdot R2 / \{15 \cdot d \cdot (R2-R1)\} \quad (2)$$

In the above formula (2), P is the track pitch of the magneto-optical disk 34, d is the distance between the two adjacent light spots 15 and 16 on the magneto-optical disk 34, R1 is the innermost radial position of the magneto-optical disk 34, and R2 the outermost radial position of the magneto-optical disk 34.

As described above, the present invention can assure sufficient tracking accuracy when the tracking servo of the push-pull method using one of plural light spots is effected, for the light spots.

By this arrangement, the present invention obviates the need for a dove prism and an image-rotating actuator, which were required in the conventional example in order to maintain the necessary tracking accuracy for a plurality of light spots. Also, the present invention obviates the need for accurately positioning the three light spots on the photodetectors in the tracking direction, as required in the conventional example. Therefore, the present invention can provide an optical head which is cheap and compact and which can achieve the necessary tracking accuracy for a plurality of light spots.

What is claimed is:

1. An optical recording and/or reproducing apparatus comprising:

focusing means for focusing a beam from a light source passing through an imaging optical system to image the beam as a plurality of fine light spots, for performing at least one of recording of information and reproduction of information, on the same track on an optical recording medium rotating and having substantially concentric tracks;

adjusting means for adjusting, with respect to a predetermined track, positions of a first light spot and a second light spot spaced apart from each other by a distance d, among the plurality of light spots;

tracking means for performing positioning in a direction transverse to the track of the optical recording medium, of the first light spot with respect to an arbitrary track, using return light from the optical recording medium, of the first light spot, while keeping a relative positional relation of the plurality of light spots relative to the predetermined track;

moving means for moving the plurality of light spots in parallel with a radial direction of the optical recording medium; and means for setting $\Delta$, P, R1, R2, and d so that the following relation holds:

$$\Delta \leq P \cdot R1 \cdot R2 / \{15 \cdot d \cdot (R2-R1)\}$$

where $\Delta$ is the distance between a center of rotation of the concentric tracks and a locus of the first light spot moving in the radial direction on the recording medium, d is the distance between the first light spot and the second light spot on said optical recording medium, R1 is the innermost radial position of the plurality of light spots moved by said moving means, from the center of rotation of the concentric tracks, R2 is the outermost radial position of the plurality of light spots moved by said moving means, from the center of rotation of the concentric tracks, and P is the track pitch of the optical recording medium.

2. An optical recording and/or reproducing apparatus according to claim 1, wherein the light source is a semiconductor laser having a single radiative point and wherein said apparatus further comprises a diffraction grating set between the semiconductor laser and the optical recording medium to produce the plurality of light spots.

3. An optical recording and/or reproducing apparatus according to claim 2, wherein said adjusting means is means for rotating said diffracting grating about an optical axis of the imaging optical system.

4. An optical recording and/or reproducing apparatus according to claim 1, wherein the light source is a semiconductor laser having a plurality of radiative points.

5. An optical recording and/or reproducing apparatus according to claim 4, wherein said adjusting means is means for rotating the semiconductor laser having a plurality of radiative points about an optical axis of the imaging optical system.

6. An optical recording and/or reproducing apparatus according to claim 1, further comprising means for recording of information with the first light spot and for reproducing the information immediately after being recorded with the second light spot.

7. An optical recording and/or reproducing apparatus according to claim 1, wherein said tracking means performs positioning, in the direction transverse to the track, of the first light spot and the second light spot in such a manner that the sign of detracking of the second light spot located at the innermost radial position R1 is opposite to that of the second light spot located at the outermost radial position R2.

8. An optical recording and/or reproducing apparatus according to claim 1, wherein when the plurality of light spots are moved to a radial position R3 (R1≦R3≦R2), the following relation of the radial position R3 holds:

$$1.8 \cdot R1 \cdot R2/(R1+R2) \leq R3 \leq 2.4 \cdot R1 \cdot R2/(R1+R2).$$

9. An optical recording and/or reproducing apparatus according to claim 8, wherein the following relation of the radial position R3 holds:

$$R3 = 2 \cdot R1 \cdot R2/(R1+R2).$$

10. An optical recording and/or reproducing apparatus according to claim 8, wherein means for setting sets $\Delta$, P, R1, R2, and d so that the following relation holds:

$$\Delta \leq P \cdot R1 \cdot R2 / \{8 \cdot d \cdot (R2-R1)\}.$$

11. An optical recording and/or reproducing apparatus according to claim 1, further comprising adjusting means for adjusting the distance $\Delta$ between the center of rotation of the concentric tracks and the locus of the first light spot moving in the radial direction on the optical recording medium.

12. An optical recording and/or reproducing apparatus according to claim 1, wherein said adjusting means is moving means for moving driving means for rotating the optical recording medium.

13. An optical recording and/or reproducing apparatus comprising:

focusing means for focusing a beam from a light source passing through an imaging optical system to image the beam as a plurality of fine light spots, for performing at least one of recording of information and reproduction of information, on adjacent tracks on an optical recording medium rotating and having substantially concentric tracks;

adjusting means for adjusting, with respect to a predetermined track, positions of a first light spot and a second light spot spaced apart from each other by a distance d, among the plurality of light spots;

tracking means for performing positioning in a direction transverse to the track of the optical recording medium, of the first light spot with respect to an arbitrary track, using return light from the optical recording medium, of the first light spot, while keeping the relative positional relation of the plurality of light spots relative to the predetermined track;

moving means for moving the plurality of light spots in parallel with a radial direction of the optical recording medium; and means for setting $\Delta$, P, R1, R2, and d so that the following relation holds:

$$\Delta \leq P \cdot R1 \cdot R2 / \{15 \cdot d \cdot (R2-R1)\}$$

where $\Delta$ is a distance between a center of rotation the concentric tracks and a locus of the first light spot moving in the radial direction on the recording medium, d is the distance between the first light spot and the second light spot on the optical recording medium, R1 is the innermost radial position of the plurality of light spots moved by said moving means, from the center or rotation of the concentric tracks, R2 is the outermost radial position of the plurality of light spots moved by said moving means, from the center of rotation of the concentric tracks, and P is the track pitch of the optical recording medium.

14. An optical recording and/or reproducing apparatus according to claim 13, wherein the light source is a semiconductor laser having a plurality of radiative points.

15. An optical recording and/or reproducing apparatus according to claim 14, wherein said adjusting means is means for rotating the semiconductor laser having a plurality of radiative points about an optical axis of the imaging optical system.

16. An optical recording and/or reproducing apparatus according to claim 13, further comprising means for recording of information or the reproduction of information with the plurality of light spots over a plurality of tracks simultaneously.

17. An optical recording and/or reproducing apparatus according to claim 13, wherein said tracking means performs positioning, in the direction transverse to the track, of the first light spot and the second light spot in such a manner that a sign of detracking of the second light spot located at the innermost radial position R1 is opposite to that of the second light spot located at the outermost radial position R2.

18. An optical recording and/or reproducing apparatus according to claim 13, wherein when the plurality of light spots are moved to a radial position R3 ($R1 \leq R3 \leq R2$), the following relation of the radial position R3 holds:

$$1.8 \cdot R1 \cdot R2/(R1+R2) \leq R3 \leq 2.4 \cdot R1 \cdot R2/(R1+R2).$$

19. An optical recording and/or reproducing apparatus according to claim 18, wherein the following relation of the radial position R3 holds:

$$R3 = 2 \cdot R1 \cdot R2/(R1+R2).$$

20. An optical recording and/or reproducing apparatus according to claim 18, wherein means for setting sets $\Delta$, P, R1, R2, and d so that the following relation holds:

$$\Delta \leq P \cdot R1 \cdot R2 / \{8 \cdot d \cdot (R2-R1)\}.$$

21. An optical recording and/or reproducing apparatus according to claim 13, comprising adjusting means for adjusting the distance $\Delta$ between the center of rotation of the concentric tracks and the locus of the first light spot moving in the radial direction on the optical recording medium.

22. An optical recording and/or reproducing apparatus according to claim 13, wherein said adjusting means is moving means for moving driving means for rotating the optical recording medium.

23. An optical recording and/or reproducing apparatus according to claim 1, wherein said adjusting means adjusts the positions of the first and second light spots in a direction transverse to the predetermined track.

24. An optical recording and/or reproducing apparatus according to claim 13, wherein said adjusting means adjusts the positions of the first and second light spots in a direction transverse to the predetermined track.

* * * * *

UNITED STATES PATENT AND TRADEMARK OFFICE
CERTIFICATE OF CORRECTION

PATENT NO. : 5,594,711
DATED : January 14, 1997
INVENTOR(S) : OSAMU KOYAMA

It is certified that error appears in the above-indentified patent and that said Letters Patent is hereby corrected as shown below:

ON COVER PAGE:

Item: [56] References Cited:

FOREIGN PATENT DOCUMENTS:

"1177510 7/1989 Japan" should read --1-177510 7/1989 Japan.--

COLUMN 2:

Line 47, "defracted light, as" should read --deffracted light,--.

COLUMN 8:

Line 2, "while" should be deleted.

Line 45, "after" should read --after it is--.

UNITED STATES PATENT AND TRADEMARK OFFICE
CERTIFICATE OF CORRECTION

PATENT NO.   :   5,594,711
DATED        :   January 14, 1997
INVENTOR(S)  :   OSAMU KOYAMA It is certified that error appears in the above-indentified patent and that said Letters Patent is hereby corrected as shown below:

COLUMN 10:

Line 12, "thereof components" should read --thereof. Components--.

Line 34, "have" should read --have to--.

COLUMN 11:

Line 31, "guadrant" should read --quadrant--.

COLUMN 12:

Line 58, "embodiment" should read --embodiments--.

UNITED STATES PATENT AND TRADEMARK OFFICE
CERTIFICATE OF CORRECTION

PATENT NO. : 5,594,711
DATED : January 14, 1997
INVENTOR(S) : OSAMU KOYAMA

It is certified that error appears in the above-indentified patent and that said Letters Patent is hereby corrected as shown below:

COLUMN 15:

Line 27, "the" should read --of the--.

Line 33, "or" should read --of--.

Signed and Sealed this

Twenty-fourth Day of June, 1997

Attest:

BRUCE LEHMAN

Attesting Officer

Commissioner of Patents and Trademarks